(12) United States Patent
Takahashi

(10) Patent No.: US 11,989,402 B2
(45) Date of Patent: May 21, 2024

(54) INFORMATION PROCESSING DEVICE CONFIGURED TO GENERATE SCREEN DATA TO DISPLAY ICONS, SCREEN GENERATING METHOD, AND NON-TRANSITORY COMPUTER-READABLE RECORDING MEDIUM THEREFOR

(71) Applicant: BROTHER KOGYO KABUSHIKI KAISHA, Nagoya (JP)

(72) Inventor: Eriko Takahashi, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/213,544

(22) Filed: Mar. 26, 2021

(65) Prior Publication Data
US 2021/0303144 A1    Sep. 30, 2021

(30) Foreign Application Priority Data

Mar. 31, 2020  (JP) .................................. 2020-062723

(51) Int. Cl.
*G06F 3/04847*    (2022.01)
*G06F 3/04817*    (2022.01)

(52) U.S. Cl.
CPC ...... *G06F 3/04847* (2013.01); *G06F 3/04817* (2013.01)

(58) Field of Classification Search
CPC .......................... G06F 3/04847; G06F 3/04817
See application file for complete search history.

(56) References Cited

U.S. PATENT DOCUMENTS

| 2004/0039811 | A1* | 2/2004 | Nakamura | G06F 3/1204 709/223 |
| 2004/0216058 | A1* | 10/2004 | Chavers | G06F 3/0481 715/810 |
| 2012/0144329 | A1* | 6/2012 | Sasaki | G06F 9/44505 715/764 |
| 2020/0133595 | A1* | 4/2020 | Matsui | G06F 3/1225 |

FOREIGN PATENT DOCUMENTS

| JP | 2010009167 A | 1/2010 |
| JP | 2011-154474 A | 8/2011 |
| JP | 2018075777 A | 5/2018 |

OTHER PUBLICATIONS

Notice of Reasons for Refusal dated Jan. 9, 2024 received from the Japanese Patent Office in related JP 2020-062723 together with English language translation.

* cited by examiner

*Primary Examiner* — John T Repsher, III
(74) *Attorney, Agent, or Firm* — Scully, Scott, Murphy & Presser, PC

(57) ABSTRACT

A first information processing device is configured to customize a first screen to be displayed by an image processing device and a second screen to be displayed by a second information processing device. The first information processing device displays a customizing screen including multiple icon areas similar to the first screen and a second screen. The first information processing device sets an icon designated by a user to an icon area targeted to be customized. The first information processing device generates first screen data and second screen data reflecting the results of customization on the customizing screen.

7 Claims, 11 Drawing Sheets

| ICON AREA | ICON NAME | DEVICE-USE WORKFLOW*1 | APP-USE WORKFLOW*2 | DEVICE-USE IMAGE DATA*1 | APP-USE IMAGE DATA*2 |
|---|---|---|---|---|---|
| FIRST ICON AREA | Facsimile to AA | 1: Scan (gray)<br>2: Store in Order DB<br>3: FAX to AA | 1: Scan (gray)<br>2: Store in Order DB<br>3: FAX to AA | (no data) | (no data) |
| SECOND ICON AREA | Mail to BB | 1: Scan (gray)<br>2: Mail to BB | 1: Scan (gray)<br>2: Mail to BB | image_BB.jpg | image_BB.jpg |
| THIRD ICON AREA | OCR Scan to DATABASE | 1-1: Scan (gray)<br>1-2: Send to OCR DB<br>1-3: Obtain OCR File<br>2: Store in Estimate DB | 1: Scan (gray)<br>With OCR<br>2: Store in Estimate DB<br>3: Preview Display | image_OCR_Dev.png | (no data) |
| | -------- | -------- | -------- | -------- | -------- |

*1: Part of 1st Customization Data (Device-use)
*2: Part of 2nd Customization Data (APP-use)

FIG. 6

INFORMATION PROCESSING DEVICE CONFIGURED TO GENERATE SCREEN DATA TO DISPLAY ICONS, SCREEN GENERATING METHOD, AND NON-TRANSITORY COMPUTER-READABLE RECORDING MEDIUM THEREFOR

CROSS-REFERENCE TO RELATED APPLICATIONS

This application claims priority under 35 U.S.C. § 119 from Japanese Patent Application No. 2020-062723 filed on Mar. 31, 2020. The entire subject matter of the application is incorporated herein by reference.

BACKGROUND

Technical Field

The present disclosures relate to a technique of creating a screen to be displayed on an image processing device and an information processing device using another information processing device, which is different from the image processing device and the information processing device.

Related Art

Conventionally, there is known a technique of displaying an icon on a display of an image processing device. Typically, such an icon is associated with a particular process, and when a user operates the icon (e.g., touch on the icon), the image processing device performs the particular process.

There is also known a technique to enable an information processing device, which is different from the image processing device, to customize the icon with which the particular process is associated.

There is further known a technique, which is similar to the above-mentioned technique, of displaying an icon on a display of an information processing device to remotely cause an image processing device to perform a particular process. Further, there is also known a technique to enable the information processing device to customize such an icon with which the particular process is associated.

SUMMARY

There could be a need of displaying icons that are identical, similar or related to each other in both the image processing device and the information processing device.

As an example, there may be a case where an image of an original document is scanned by an image processing device, and it is desired that icons associated with a process of transmitting image data representing the scanned image to a particular device. In such a case, there is a need that the icons with which the particular process is associated are displayed in both of the image processing device and the information processing device so that the data transmission operation can be performed from desired one of the image processing device and the information processing device.

For such a need, it is desirable that the icons to be displayed on the image processing device and the information processing device are generated efficiently.

According to aspects of the present disclosures, there is provided a non-transitory computer-readable recording medium for a first information processing device provided with a display, an inputting device and a controller. The recording medium containing computer-executable instructions which cause, when executed, the controller to generate first data representing a first screen to be displayed by an image processing device, and second data representing a second screen to be displayed by a second information processing device, each of the first screen and the second screen having multiple icon areas in which icons are to be displayed. The instructions further cause, when executed, the controller to perform a displaying process of displaying a customizing screen including multiple icon areas on the display, an area setting process of setting one of the multiple icon areas included in the customizing screen as a setting target area, an icon designation process of receiving an icon designation operation to designate an icon through the inputting device, an icon setting process including a both screen setting process of setting the icon designated by the icon designation operation to be displayed in the icon area corresponding to the setting target area set by the area setting process among the multiple icon areas of each of the first screen and the second screen, and a data generating process of generating the first screen data and the second screen data based on a setting result of the icon setting process.

According to aspects of the present disclosures, there is provided an information processing device, comprising a display, an inputting device, and a controller. The information processing device is configured to generate first data representing a first screen to be displayed by an image processing device, and second data representing a second screen to be displayed by a second information processing device, each of the first screen and the second screen having multiple icon areas in which icons are to be displayed. The controller is configured to perform a displaying process of displaying a customizing screen including multiple icon areas on the display, an area setting process of setting one of the multiple icon areas included in the customizing screen as a setting target area, an icon designation process of receiving an icon designation operation to designate an icon through the inputting device, an icon setting process including a both screen setting process of setting the icon designated by the icon designation operation to be displayed in the icon area corresponding to the setting target area set by the area setting process among the plurality of icon areas of each of the first screen and the second screen, and a data generating process of generating the first screen data and the second screen data based on a setting result of the icon setting process.

According to aspects of the present disclosures, there is provided a screen generating method performed in an information processing device. The information processing device is configured to generate first data representing a first screen to be displayed by an image processing device, and second data representing a second screen to be displayed by a second information processing device. Each of the first screen and the second screen has multiple icon areas in which icons are to be displayed. The method comprising displaying a customizing screen including multiple icon areas on the display, setting one of the multiple icon areas included in the customizing screen as a setting target area, receiving an icon designation operation to designate an icon through the inputting device, setting the icon designated by the icon designation operation to be displayed in the icon area corresponding to the setting target area set by the area setting process among the plurality of icon areas of each of the first screen and the second screen, and generating the first screen data and the second screen data based on a setting result of the icon setting process.

BRIEF DESCRIPTION OF THE DRAWINGS

FIG. 6 is a table illustrating a part of first customization data and second customization data.

DETAILED DESCRIPTION OF THE EMBODIMENT

An illustrative embodiment according to the present disclosures will be described below with reference to the accompanying drawings.

1. Embodiment (1-1) Overview of Information Processing System

Figure 1:
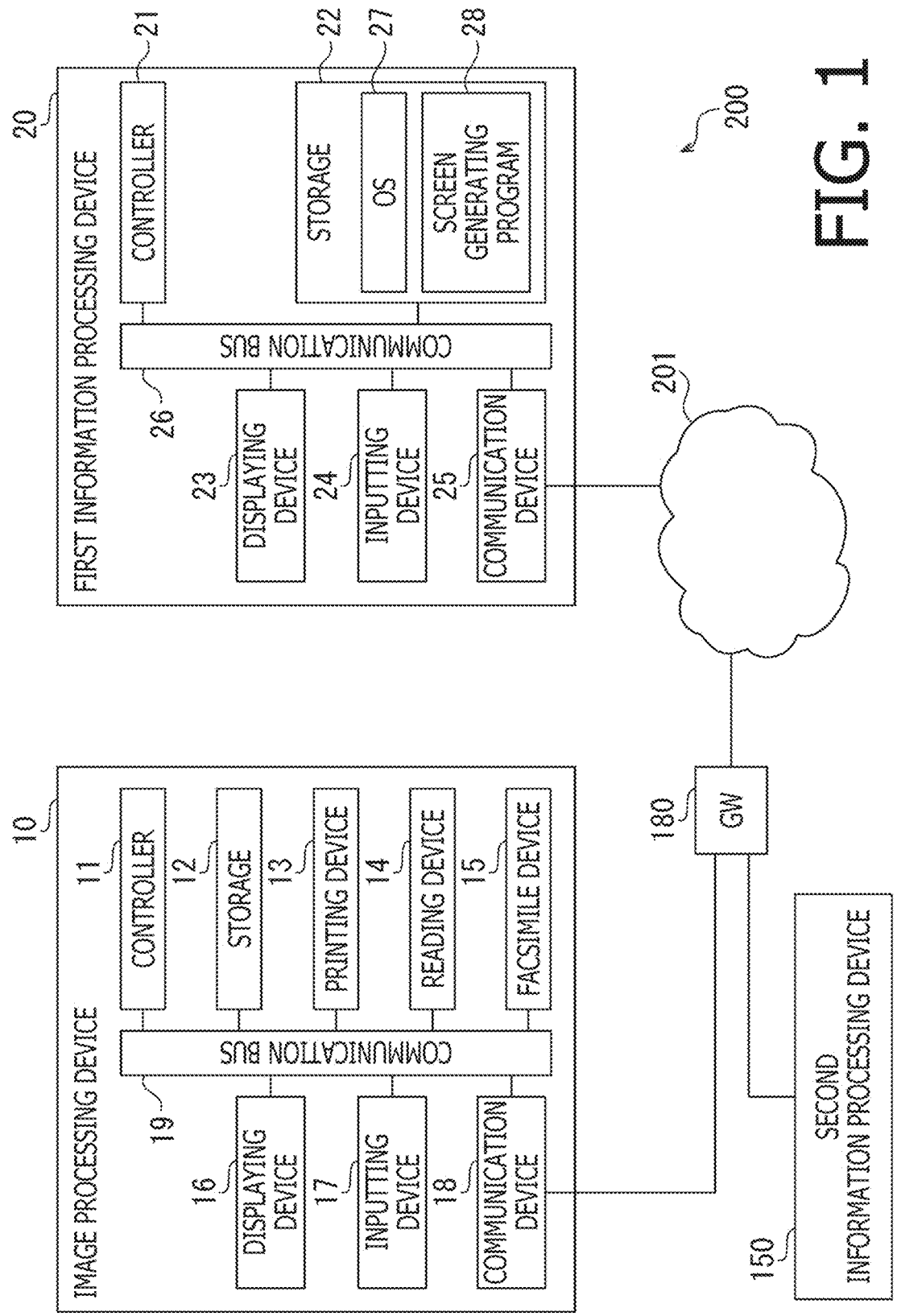
FIG. 1 is a block diagram showing a configuration of an information processing system including an image processing device, a first information processing device and a second information processing device.

An information processing system 200 according to the present embodiment shown in FIG. 1 includes an image processing device 10, a first information processing device 20, and a second information processing device 150.

The image processing device 10, the first information processing device 20, and the second information processing device 150 are configured to communicate with each other through a communication network 201. The communication network 201 may be of any kind. For example, the communication network 201 may be the Internet, a wired LAN, a wireless LAN, a USB, or a combination thereof.

The image processing device 10 and the second information processing device 150 are included in a local network in this embodiment. The local network is equipped with a gateway 180. The gateway 180 connects the local network to the communication network 201. The gateway 180 further connects the devices in the local network connected to the gateway 180 so as to be communicable with each other. The gateway 180 may, for example, be equipped with a function of a broadband router. The image processing device 10 and the second information processing device 150 may be wired or wirelessly connected to the gateway 180.

(1-2) Configuration of Image Processing Device

As shown in FIG. 1, the image processing device 10 is equipped with a controller 11, a storage 12, a printing device 13, a reading device 14, a facsimile device 15, a displaying device 16, an inputting device 17, and a communication device 18. The above components in the image processing device 10 are connected to each other through a communication bus 19. The image processing device 10 is equipped with multiple basic functions such as a printing function, a scanning function, a facsimile function, and a copying function.

The printing device 13 realizes the printing function. That is, the printing device 13 has a printing mechanism according to an inkjet technique, an electrophotographic imaging technique or the like. The printing device 13 is configured to print an image based on image data on a sheet-type recording medium using a printing mechanism.

The reading device 14 realizes the scanning function. The reading device 14 is equipped with an image sensor. The reading device 14 is configured to read an image formed on the original document using the image sensor and generate image data representing the read image.

The facsimile device 15 realizes the facsimile function. The facsimile device 15 is configured to transmit facsimile data to external devices, and receive facsimile data transmitted from the external devices.

The copying function is a composite function including the scanning function and the printing function. The copying function prints, with use of the printing function, the image scanned with use of the scanning function.

The communication device 18 is a communication interface which is configured to interface communication with various external devices. In this embodiment, the communication device 18 is connected to the gateway 180. The image processing device 10 can communicate with various external devices, including the first information processing device 20 and the second information processing device 150, via the communication device 18.

The displaying device 16 is equipped with a display such as a liquid crystal display or organic EL display, and is configured to display images.

The inputting device 17 is equipped with operable devices for receiving various inputting operations performed by the user. The operable devices of the inputting device 17 include, for example, various types of hard keys and a touch panel. The touch panel is typically overlaid on a display area, where images are displayed, on the display of the displaying device 16.

The touch panel is an inputting operable device that is configured to detect a designating operation to designate a position using a designating body, such as a fingertip or a pen, to the image display area of the displaying device 16. The term "designating operation" here includes at least one of contacting the designating body to a certain position and bringing the designating body in a proximity to a certain position. When the designating operation is performed using the designating body, the touch panel outputs an operation detection signal indicating the position where the designating operation was performed.

Based on the operation detection signals output from the touch panel, the controller 11 detects whether the designating operation is performed, the position of the designating operation when performed, etc., and also detects a type of the user operation in accordance with the designating operation based on the detection results. The detectable operation types include, for example, tapping, dragging, dragging & dropping, flicking, pinching-in, pinching-out, etc.

The controller 11 is equipped with a CPU, for example. The controller 11 controls the operation of each component of the image processing device 10 according to various pieces of input information including operation detection signals from the touch panel, thereby realizing various functions such as the printing function and the scanning function as described above.

The storage 12 is equipped with a semiconductor memory such as a ROM, a RAM, an NVRAM, a flash memory, etc. In other words, the image processing device 10 is equipped with a microcomputer including a CPU and the semiconductor memory. Various programs and data are stored in the storage 12.

The controller 11 realizes various functions by executing various programs stored in the storage 12. The various functions realized by the controller 11 are not necessarily be limited to those realized by executing the programs. The various functions may be partially or entirely realized by using one or multiple pieces of hardware.

The controller 11 is configured to display various screens on the displaying device 16. The various screens include, for example, a function selection screen 30 illustrated in FIG. 2A. After startup, the controller 11 displays the function selection screen 30 on the displaying device 16 after performing a particular initialization process.

Figure 2A:
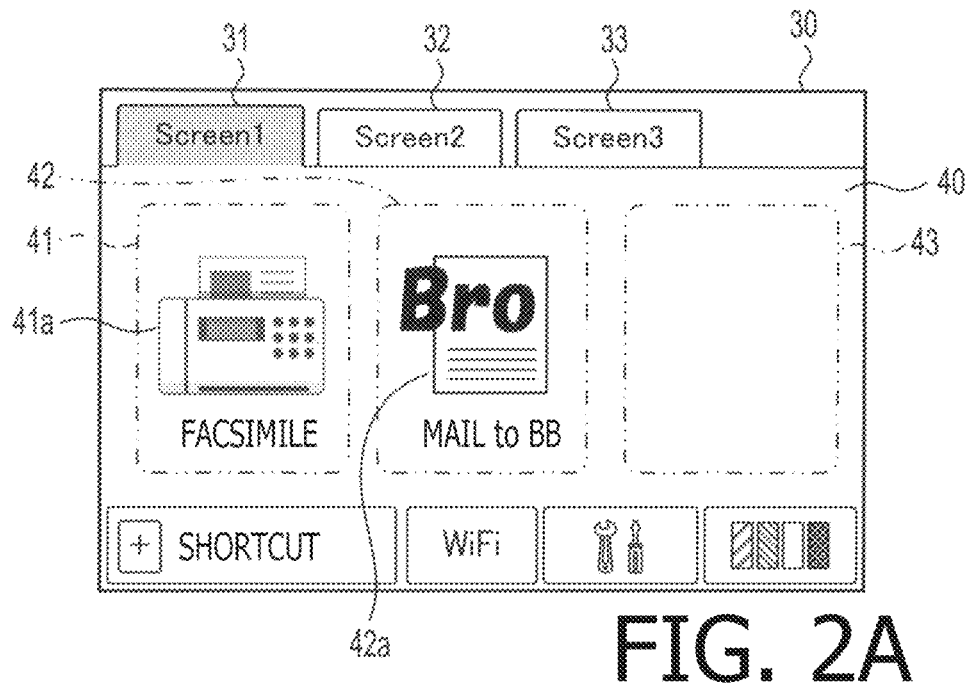
FIG. 2A shows a function selection screen displayed on the image processing device.

The function selection screen 30 has multiple icon areas. For example, the function selection screen 30 according to the present embodiment has a first icon area 41, a second icon area 42, and a third icon area 43. Each of the icon areas 41, 42 and 43 can be associated with icon data which will be described later. In each of the icon areas where the icon data is associated, an icon represented by the associated icon data is displayed. FIG. 2A shows, as an example, a facsimile icon 41a displayed in the first icon area 41, and a mail sending icon 42a displayed in the second icon area 42.

The function selection screen 30 is, for example, a tabbed screen. That is, multiple tabs 31, 32, 33 are displayed in the function selection screen 30, and each tab is associated with a tab screen. In the function selection screen 30, a tab screen corresponding to a currently selected tub is displayed. FIG. 2A shows an example in which the tab 31 is selected and a tab screen 40 associated with the tab 31 is displayed.

The function selection screen 30 is displayed according to the first screen data stored in the storage 12. The first screen data includes the icon data for each icon displayed on the function selection screen 30.

The icon data includes icon image data, display area data, and workflow data. The icon image data represents various data that determines an appearance of the icon, such as a size and a pattern of the corresponding icon. The display area data represents the icon area in which the corresponding icon is displayed. The workflow data represents a workflow to be executed when an icon is selected (e.g., tapped). The workflow data includes data representing the contents, procedures, etc. of the workflow, setting values for each of the various parameters used in executing the workflow, and data for the screen to be displayed on the displaying device 16 during execution of the workflow.

In response to selective operation of any of the icons in the function selection screen 30, the controller 11 executes a workflow according to the workflow data corresponding to the selected icon. For example, the workflow that is associated with the facsimile icon 41a is a particular facsimile transmission process using the facsimile function.

(1-3) Configuration of First Information Processing Device

The first information processing device 20 is an information processing terminal which can be any of various types, such as a personal computer, a tablet terminal, or a smartphone. As shown in FIG. 1, the first information processing device 20 has a controller 21, a storage 22, a displaying device 23, an inputting device 24, and a communication device 25, which are connected to each other through a communication bus 26.

The controller 21 has, for example, a CPT. The storage 22 has, for example, a semiconductor memory such as a ROM, a RAM, an NVRAM, and a flash memory. In other words, the first information processing device 20 according to the present embodiment has a microcomputer including a CPU and a semiconductor memory.

The controller 21 realizes various functions as the controller 21 executes a program stored in a non-transitory tangible recording medium. In this embodiment, the storage 22 corresponds to the non-transitory tangible recording medium that stores programs, or computer-executable instructions. The various functions of the first information processing device 20 are basically realized by the controller 21 executing the program stored in the storage 22. The various functions realized by the controller 21 are not necessarily be limited to those realized by executing the program, but the various functions may be realized in part or in whole by using one or more pieces of hardware.

Various software and data are stored in the storage 22. In the present embodiment, at least an operating system (OS) 27 and a screen generating program 28 are stored in the storage 22 as the software. The screen generating program 28 is a program which causes, when executed, the controller 21 to customize the function selection screen 30 displayed on the image processing device 10 and a function selection screen 151 (see FIG. 2B) described below displayed on the second information processing device 150. In other words, the screen generating program 28 is a program configured to cause the controller 21 to customize the first screen data and the second screen data described below.

In the following description, the controller 21 (in detail, an unshown CPU provide to the controller 21) that executes the program may be described simply by the program name. For example, a statement "the screen generating program 28 is" may mean "the CPU that executes the screen generating program 28 is."

The displaying device 23 has a display such as a liquid crystal display or organic EL display capable of displaying images. The inputting device 24 has devices for input to receive various inputting operations by the user.

Operable devices the inputting device 24 has include, for example, a keyboard, a mouse, and a touch panel. The touch panel is typically overlaid on the image display area of the display of the displaying device 23.

When the inputting device 24 has the touch panel, for example, the controller 21 detects a type of a user operation on the touch panel, such as tapping, dragging, dragging and dropping, flicking, pinching-in, pinching-out, etc., in the same way as is done in the image processing device 10.

When the inputting device 24 has a mouse, for example, the controller 21 displays a pointer on the displaying device 23 and moves the pointer in response to movement of the mouse. The controller 21 also receive commonly known mouse operations such as double-clicking, right-clicking, and left-clicking.

The communication device 25 is a communication interface for communicating with various external devices. In this embodiment, the communication device 25 is connected to the communication network 201. The first information processing device 20 can communicate with various external devices, including the image processing device 10 and the second information processing device 150, via the communication device 25.

(1-4) Overview of Second Information Processing Device

The second information processing device 150 could be any of information processing terminals, such as a personal computer, a tablet terminal, or a smartphone. Configuration of the second information processing device 150 is not limited to a particular configuration. In this embodiment, the second information processing device 150 is equipped with hardware same as that of the first information processing device 20. That is, the second information processing device 150 has a controller, a storage, a displaying device, an inputting device, and a communication device.

Various programs, data, etc., including the OS, are stored in the storage. The various programs stored in the storage include programs for a function execution application.

Figure 2B:
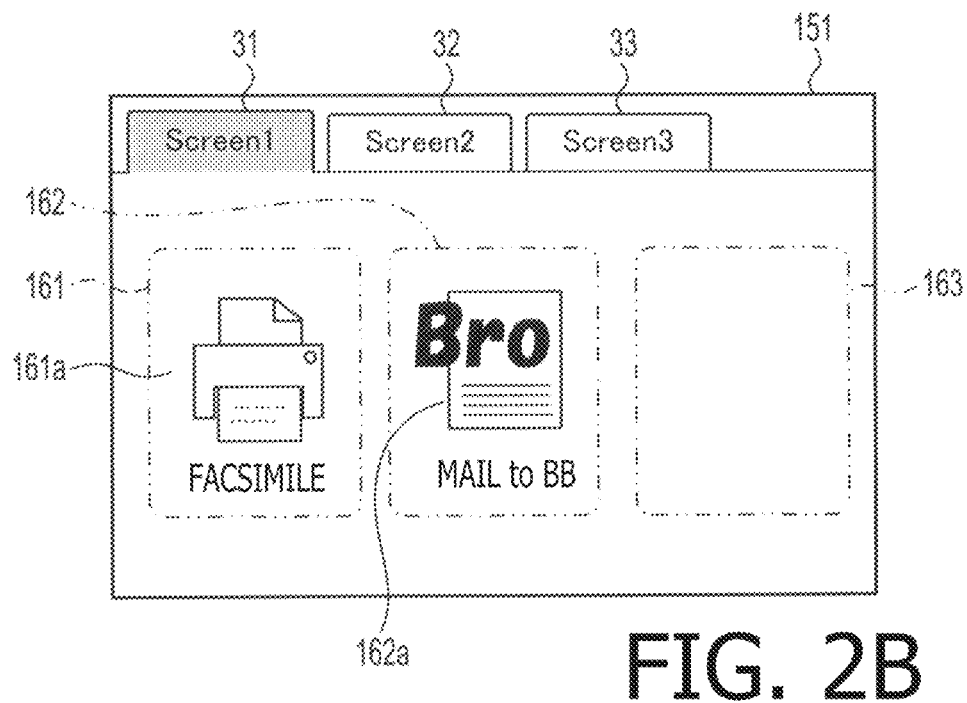
FIG. 2B shows a function selection screen displayed on the second information processing device.

The function execution application displays, on the display, a function selection screen 151 illustrated in FIG. 2B. The function selection screen 151 has a plurality of icon areas. In this embodiment, the function selection screen 151 is basically configured in the same way as the function selection screen 30 of the image processing device 10. That is, the function selection screen 151 has a first icon area 161, a second icon area 162, and a third icon area 163. Each of the icon areas 161, 162 and 163 can be associated with the icon data described below. The function selection screen 151, like the function selection screen 30 of the image processing device 10, is a tabbed screen.

In the icon area where the icon data is associated, the icon represented by the associated icon data is displayed. FIG. 2B shows an example that a facsimile icon 161a is displayed in the first icon area 161, and an e-mail sending icon 162b is displayed in the second icon area 162.

The function selection screen 151 is displayed according to the second screen data stored in the storage. The second screen data includes icon data for each icon displayed on the function selection screen 151. The icon data includes icon image data, display area data, and workflow data.

The function execution application executes a workflow according to the workflow data corresponding to the selected icon in response to the selective operation of any of the icons on the function selection screen 151. For example, a workflow associated with the facsimile icon 161a is a process of transmitting designated facsimile data to a designated destination.

The processes that are associated with the icons displayed on the function selection screen 151 can include processes that use the image processing device 10. For example, an icon corresponding to a workflow that uses the scanning function of the image processing device 10 may be displayed. In such a case, when the icon is selected, for example, a scanning instruction is sent to the image processing device 10, and the scan data generated by the image processing device 10 in response to the scanning instruction is received.

FIG. 2A and FIG. 2B show an example where icons of the same functions are indicated in the function selection screen 30 of the image processing device 10 and the function selection screen 151 of the function execution application. In other words, by selecting and operating the facsimile icon 41a in the image processing device 10, the image processing device 10 is caused to send facsimile data. Further, by selecting and operating the facsimile icon 161a in the second information processing device 150, the second image processing device 150 is caused to send facsimile data.

It is noted, however, that FIGS. 2A and 2B show only one example of the function selection screens 30 and 151 having icons of the same function, and a part or all of the icons displayed in the function selection screens 30 and 151 may be different from each other. For example, the icons displayed on the function selection screen 30 and the icons displayed on the function selection screen 151 may be the same or different. The aforementioned screen generating program 28 is configured to set the icons of the same function in both of the function selection screens 30 and 151 in a batch.

(1-5) Screen Generating Program

Figure 3:
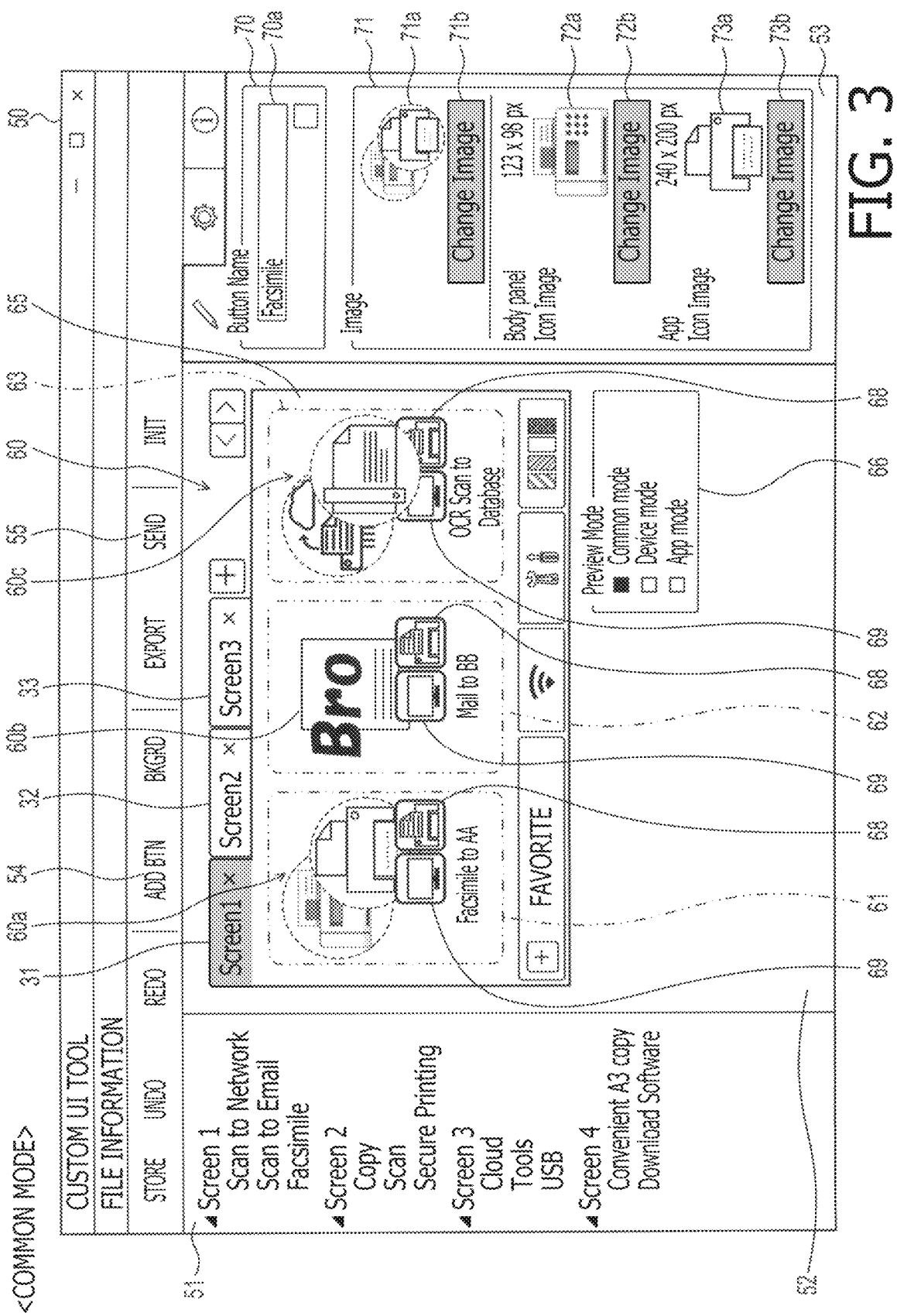
FIG. 3 shows a main screen in a common mode.

In the first information processing device 20, when the screen generating program 28 is executed by the controller 21, the main screen 50 shown in FIG. 3 is displayed on the displaying device 23. The main screen 50 is a screen that serves as a starting point for customizing the function selection screen 30 of the image processing device 10 and the function selection screen 151 of the second information processing device 150.

The "customization" here includes adding a new icon to an icon area where no icon has yet been associated, changing the icon image data and workflow data associated with an icon that has already been associated with an icon area, and so on.

In this embodiment, however, among various functions possessed by the screen generating program 28, the function for newly setting or changing an icon image is mainly described in detail, and detailed explanations on the other functions are omitted. In this embodiment, the term "icon image" means an image of the icon represented by the icon image data, i.e., an overall appearance of the icon including its size, pattern, etc.

The screen generating program 28 can customize the icon images on the function selection screens 30 and 151, either collectively or individually.

As shown in FIG. 3, the main screen 50 includes an add button 54 and a send button 55. The add button 54 is a button that is selectively operated when adding a new icon.

The main screen 50 further includes a tree area 51, a preview area 52, and a detail area 53. In the preview area 52, a preview mode change box 66 is displayed. The preview area 52 further displays a customization screen according to a currently set preview mode among three types of customization screens: a common customization screen 60, a customization screen for devices 81 (see FIG. 4), and a customization screen for applications 82 (see FIG. 5).

The screen generating program 28 switches among the preview modes according to the setting operation performed by the user on the preview mode change box 66. In this embodiment, the preview modes include a common mode, a device mode, and an application mode. A checkbox corresponding to each of the above three modes is displayed in the preview mode change box 66. The user can select a preview mode by performing a checking operation (e.g., clicking) on any of the checkboxes. The screen generating program 28 sets the preview mode to the one selected in the preview mode change box 66.

FIG. 3 shows an example of the main screen 50 when the preview mode is set to the common mode. When the preview mode is the common mode, the common customization screen 60 is displayed.

Figure 4:
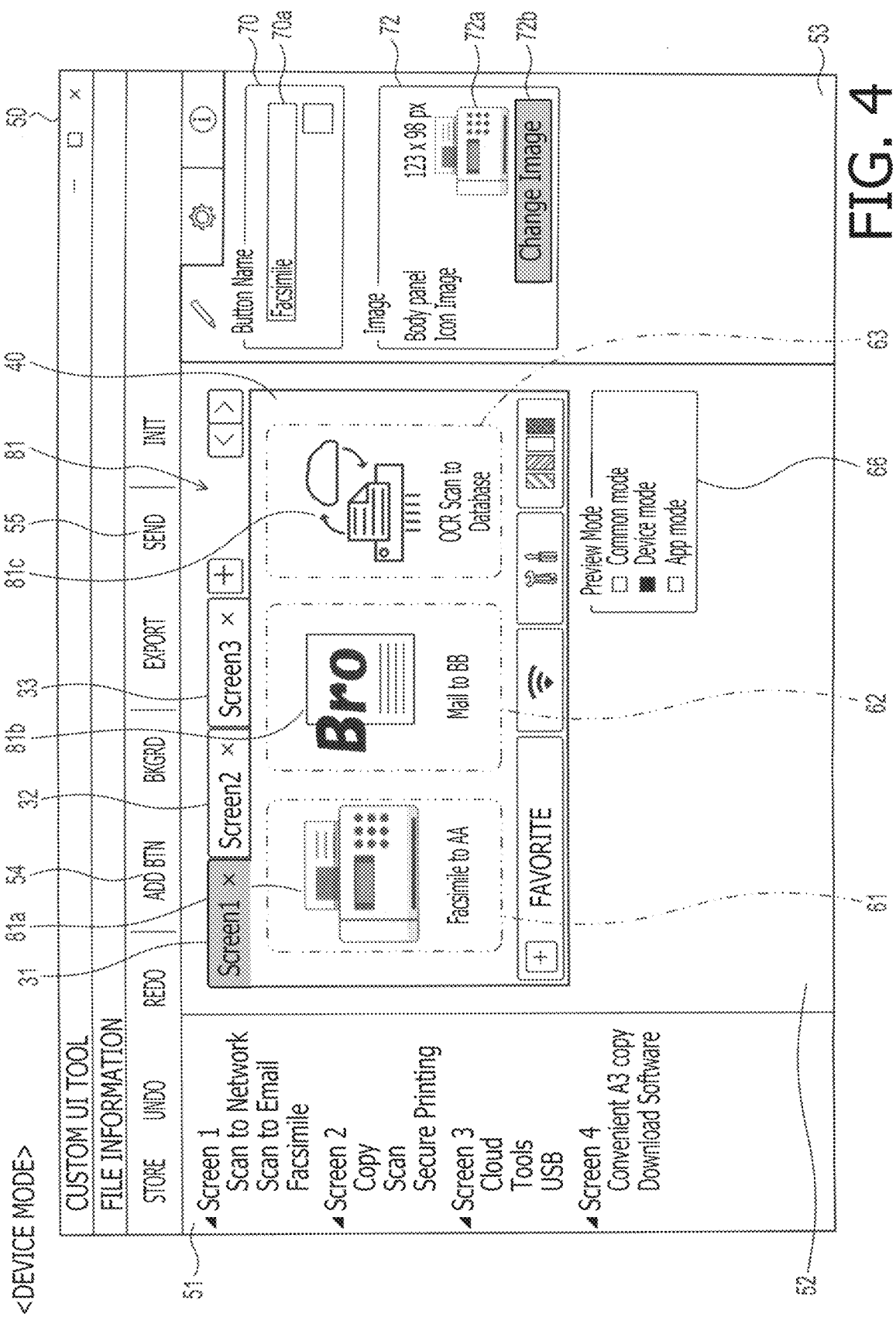
FIG. 4 shows a main screen in a device mode.

FIG. 4 shows an example of the main screen 50 when the preview mode is set to the device mode. When the preview mode is the device mode, the customization screen for device 81 (hereinafter, referred to as a device-use customization screen 81) is displayed.

Figure 5:
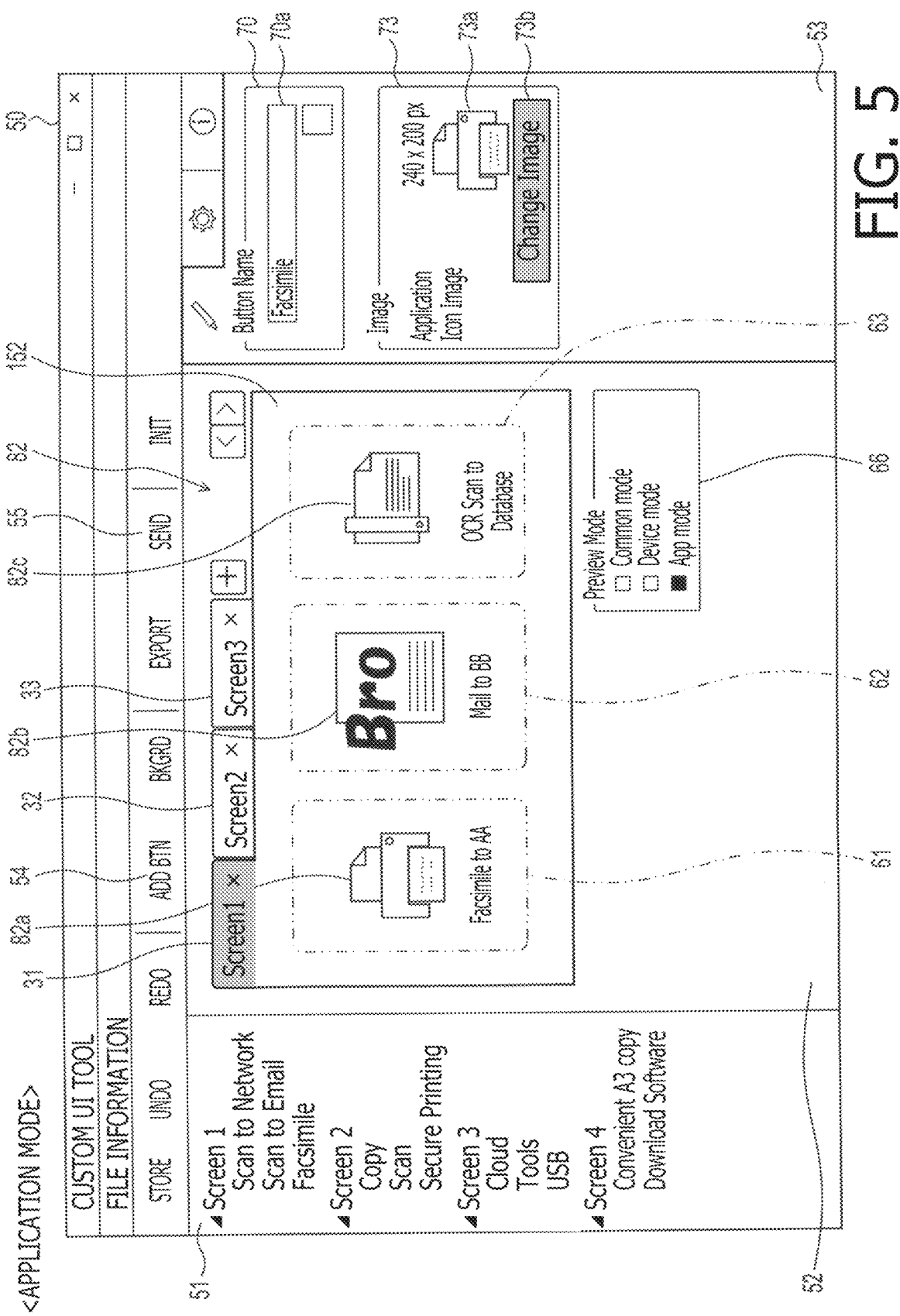
FIG. 5 shows a main screen in an application mode.

FIG. 5 shows an example of the main screen 50 when the preview mode is set to the application mode. When the preview mode is the application mode, the customization screen for applications 82 (hereinafter, referred to as an app-use customization screen 82) is displayed.

Each of the customization screens 60, 81 and 82 has three icon areas 61, 62, 63, similar to the function selection screen 30 (see FIG. 2A) of the image processing device 10 and the function selection screen 151 (see FIG. 2B) of the second information processing device 150. The first icon area 61 corresponds to the first icon areas 41 and 161 in the function selection screens 30 and 151, respectively. The second icon area 62 corresponds to the second icon areas 42 and 162 in the function selection screens 30 and 151, respectively. The third icon area 63 corresponds to the third icon area 43 and 163 in the function selection screens 30 and 151, respectively.

The device-use customization screen 81 shown in FIG. 4 is a virtual representation of the currently customized function selection screen 30 in a manner that is displayed on the image processing device 10 or in a similar manner. In other words, the device-use customization screen 81 is a preview screen of the function selection screen 30.

The device-use customization screen 81 is displayed based on the first customization data. The first customization data corresponds to the first screen data of the image processing device 10. That is, the first customized data is data that represents the function selection screen 30 of the image processing device 10, and has substantially the same structure as the first screen data.

In the device-use customization screen 81, the icon data is associated with each of the icon areas 61, 62 and 63. Hereafter, the icon data that is associated with each of the icon areas 61, 62 and 63 in the device-use customization screen 81 is referred to as first device icon data, second device icon data, and third device icon data, respectively. When any one of the three icon data is indicated, it may be referred to simply as "device icon data."

In the device-use customization screen 81, an icon based on the first device icon data (hereinafter, referred to as a "first device icon") 81*a* is associated with and displayed in the first icon area 61. An icon based on the second device icon data (hereinafter, referred to as a "second device icon") 81*b* is associated with and displayed in the second icon area 62. An icon based on the third device icon data (hereinafter, referred to as the "third device icon") 81*c* is associated with and displayed in the third icon area 63. No icon is displayed in the icon area with which no icon data is associated. In the following description, when any one of the first device icon, the second device icon, and the third device icon is indicated, it may be referred to simply as the "device icon."

The first device icon is displayed based on the icon image data (hereinafter referred to as the "first device image data") contained in the first device icon data. The second device icon is displayed based on the icon image data (hereinafter, referred to as the "second device image data") contained in the second device icon data. The third device icon is displayed based on the icon image data (hereinafter, referred to as the "third device image data") contained in the third device icon data.

A part of the first customization data showing the device-use customization screen 81 is illustrated in FIG. 6. In FIG. 6, "Workflow for device" indicates the contents of the workflow included in each device icon data. A term "(no data)" indicates that one of the default images prepared in the screen generating program 28 is set instead of an image selected from the image folder described below.

The app-use customization screen 82 shown in FIG. 5 is a virtual representation of the currently customized function selection screen 151 in the manner displayed by the function execution application in the second information processing device 150 or in a similar manner. In other words, the app-use customization screen 82 is a preview screen of the function selection screen 151.

The app-use customization screen 82 is displayed based on the second customization data. The second customization data corresponds to the second screen data to be displayed by the function execution application. That is, the second customization data is data that indicates the function selection screen 151 and has substantially the same structure as the second screen data.

In the app-use customization screen 82, icon data is associated with each of icon areas 61, 62 and 63. Hereinafter, the icon data associated with each of the icon areas 61, 62 and 63 in the app-use customization screen 82 is referred to as first application icon data, second application icon data, and third application icon data, respectively. When any one of the three icon data is indicated, it may be referred to simply as "application icon data."

In the application customization screen 82, an icon based on the first application icon data (hereinafter, referred to as a "first application icon") 82*a* is associated with and displayed in the first icon area 61. An icon based on the second application icon data (hereinafter, referred to as a "second application icon") 82*b* is associated with and displayed in the second icon area 62. An icon based on the third application icon data (hereinafter, referred to as a "third application icon") 82*c* is associated with and displayed In the third icon area 63. No icon is set and displayed in the icon area to which no icon data is associated. In the following description, when any one of the first, second, and third app icons is indicated, it may be referred to simply as "application icon."

The first app icon is displayed based on the icon image data contained in the first application icon data (hereinafter referred to as "first application image data"). The second application icon is displayed based on the icon image data included in the second app icon data (hereinafter referred to as "second application image data"). The third application icon is displayed based on the icon image data included in the third app icon data (hereinafter referred to as "third application image data").

A part of the second customization data showing the customization screen 82 for an application is illustrated in FIG. 6. In FIG. 6, "Workflow for application" indicates the contents of the workflow included in each application icon data.

The common customization screen 60 shown in FIG. 3 is a screen that integrates the currently customized function selection screens 30 and 151 according to particular display rules.

The common customization screen 60 is displayed based on the first customization data and the second customization data. That is, in the common customization screen 60, the first icon area 61 is associated with the first device icon data and the first application icon data. The second icon area 62 is associated with the second device icon data and the second application icon data. The third icon area 63 is associated with the third device icon data and the third application icon data.

Then, the first integrated icon 60*a* is displayed in the first icon area 61, the second integrated icon 60*b* is displayed in the second icon area 62, and the third integrated icon 60*c* is displayed in the third icon area 63. No icon is set or displayed in the icon area to which neither device icon data nor application icon data is associated.

Concretely, in the first icon area 61, when the first device icon data is associated and the first application icon data is not associated, the first device image data based on the first device icon data is displayed as the first integrated icon 60a. In the first icon area 61, when the first application icon data is associated and the first device icon data is not associated, the first application image data based on the first application icon data is displayed as the first integrated icon 60a.

When both the first device icon data and the first application icon data are associated with the first icon area 61, an icon based on a particular display rule is displayed as the first integrated icon 60a.

For example, when the associated first device image data and the associated first application image data show the same pattern, the icon of the pattern is displayed as the first integrated icon 60a. On the other hand, when the first device image data and the first application image data show different patterns, a particular icon is displayed as the first integrated icon 60a.

The particular icon may be an icon in any form. For example, the particular icon may be the same pattern as the first device icon or the first application icon, or the particular icon may be an icon in which the first device icon and the first application icon are partially superimposed on each other, or the particular icon may be an icon that is different from the pattern of either the first device icon or the first application icon.

FIG. 3 shows, as an example, where the first and third integrated icons 60a and 60c are the particular icons, and the form of each of the particular icons is that the first device icon and the first application icon are partially superimposed on each other.

In the second icon area 62, the second integrated icon 60b is displayed in the same manner as in the first icon area 61. In the third icon area 63, the third integrated icon 60c is displayed in the same manner as in the first icon area 61.

In addition, either or both of a first identification image 68 and a second identification image 69 are displayed in each of the icon areas 61, 62, 63 in the common customization screen 60, depending on which of the device icon data and the application icon data is associated therewith.

The first identification image 68 indicates that device icon data is associated with the corresponding icon area. The second identification image 69 indicates that app icon data is associated with the corresponding icon area.

In the device mode, the user can add icons and change icons. For example, there are two methods for adding new icons: a direct D&D method and an add button operation method. The D&D is an abbreviation for drag and drop. The add button operation method is a method in which a flow of adding a new icon is performed when the user selectively operates the add button 54. In this embodiment, the description on the add button operation method is omitted.

The direct D&D method is as follows. That is, an image file list, in which the images or file names of image files stored in an arbitrary image folder in the storage 22 are listed, is displayed on the displaying device 23. The image file list may, for example, be displayed in a pop-up window separate from the main screen 50. Then, the user selects an image from the image file list that the user wants to use as an icon image, and performs a D&D operation on the image in a vacant area to which no icon data is associated among the icon areas 61, 62 and 63 in the main screen 50. When the image is dragged and dropped (i.e., D&D-operated) into the vacant area, a new device icon with the D&D-operated image as its icon image is assigned to the vacant area. The user can then set up a workflow for the device icon.

There are, for example, two methods for changing icons: a direct D&D method and a change button operation method. The direct D&D method is basically the same as described above, but differs in that the D&D operation destination of the image file is not a vacant area, but an icon area where a device icon has already been set. When an image file is D&D-operated to an icon area where a device icon has already been set, the device image data associated with that icon area is updated to the image file that was D&D-operated. The device icon image based on the new updated device image data is then displayed.

The button operation method is a method that is performed in response to the user's operation to select the change button 72b for the device displayed in the detail area 53.

The detail area 53 displays various information for editing the icon image data and icon name of the icon associated with one icon area that is selected among each of the icon areas 61, 62 and 63 in the preview area 52 (hereinafter referred to as a "selected state area").

Concretely, a name setting frame 70 is displayed in the detail area 53. The name setting frame 70 includes a name input box 70a. The name input box 70a displays the name of the icon associated with the selected state area, that is, the text displayed in the selected state area. The user can change the name of the icon by entering any text in the name input box 70a.

An image setting frame is further displayed in the detail area 53. A content of the image setting frame varies depending on the preview mode. In the common mode, a common image setting frame 71 is displayed, as shown in FIG. 3. In device mode, a device image setting frame 72 is displayed, as shown in FIG. 4. In the application mode, an application image setting frame 73 is displayed, as shown in FIG. 5.

The device image setting frame 72 in device mode, shown in FIG. 4, is a user interface for changing the device icon image, i.e., for changing any device image data. In the device image setting frame 72, a device preset image 72a and a device change button 72b are displayed. The device preset image 72a shows the image of the device icon that is currently set in the selected state area.

The device change button 72b accepts changes of the device icon images in the selected state area. When the device change button 72b is selectively operated, the screen generating program 28 displays an icon list screen with one or more icon images on the displaying device 23. The user can select any one of the icon images displayed on the icon list screen. When an icon image is selected by the user, the device image data associated with the selected state area is changed in a batch to the data representing the selected icon image. Then, the device icon image in the selected state area and the device preset image 72a are changed to the selected icon image.

The application image setting frame 73 in the application mode shown in FIG. 5 is a user interface for changing the application icon image, that is, for changing any application image data. In the app image setting frame 73, an application preset image 73a and an application change button 73b are displayed. The application preset image 73a shows the image of the application icon that is currently set in the selected state area.

The application change button 73b accepts changes of the application icon image in the selected state area. When the application change button 73b is selectively operated, the screen generating program 28 displays the aforementioned icon list screen on the displaying device 23. When an icon image is selected from the icon list screen by the user, the application image data associated with the selected state area is changed in a batch to the data representing the selected icon image. Then, the application icon image in the selected state area and the application preset image 73*a* are changed to the selected icon image.

In the application mode, as in the device mode, icons can be changed using the direct D&D method.

The common image setting frame 71 in the common mode, shown in FIG. 3, is a user interface for changing device icon images and application icon images collectively or selectively. In the common image setting frame 71, a common preset image 71*a* and a common change button 71*b* are displayed. The common preset image 71*a* shows the image of the integrated icon displayed in the selected state area.

The common change button 71*b* accepts batch changes of device icon images and application icon images that are associated with the selected state area. When the common change button 71*b* is selectively operated, the screen generating program 28 displays the aforementioned icon list screen on the displaying device 23. When an icon image is selected from the icon list screen by the user, the device image data and the application image data associated with the selected state area are collectively changed to the data representing the selected icon image. Then, the integrated icon image and the common preset image 71*a* displayed in the selected state area are collectively changed to the selected icon image.

In the common image setting frame 71, the aforementioned device preset image 72*a*, the device change button 72*b*, the application preset image 73*a*, and the application change button 73*b* are also displayed. The device preset image 72*a* and the device change button 72*b* in the common image setting frame 71 both function in the same way as in the device mode, targeting each device icon data that is associated with each of the icon areas 61, 62 and 63. The application preset image 73*a* and the application change button 73*b* in the common image setting frame 71 both function in the same way as in the application mode, targeting each application icon data that is associated with each of the icon areas 61, 62 and 63.

In the common mode, icons can be changed by the direct D&D method. That is, when an image file is D&D-operated into an icon area where at least one of a device icon and an application icon has already been associated, the device image data and application image data associated with that icon area are updated to the D&D-operated image file in a batch. Then, a new integrated icon image corresponding to the updated result is displayed.

The screen generating program 28 may obtain the first customization data and the second customization data in any manner. For example, the screen generating program 28 may obtain the first screen data from the image processing device 10 and use the same as the first customization data, and obtain the second screen data from the second information processing device 150 and use the same as the second customization data, and display the customization screen in accordance with the preview mode based on the respective customization data. The customization screen according to the preview mode may be displayed based on the respective customization data.

Further, without obtaining the screen data from the image processing device 10 and the second information processing device 150, various other screen data may be obtained and the customization screen may be displayed based thereon. For example, a customization screen may be displayed based on a default first customization data and second customization data prepared in advance. Then, customization may be accepted using that default state as a starting point.

Each default customization data may be set such that a particular icon may be preset in one or more of the three icon areas 61, 62 and 63, or no icon may be set in any of the three icon areas 61, 62 and 63.

When the transmission button 55 displayed on the main screen 50 is selectively operated, the latest first customization data and second customization data at that time are transmitted to the corresponding destinations. That is, the first customization data is sent to the image processing device 10, and the second customized data is sent to the second information processing device 150.

When the first customization data is transmitted to the image processing device 10, the current first screen data in the image processing device 10 is updated to the transmitted first customization data. Then, the function selection screen 30 based on the new first screen data after the update is displayed in the image processing device 10.

When the second customization data is transmitted to the second information processing device 150, the function execution application updates the second screen data to the new second customization data. The function execution application then displays the function selection screen 151 based on the new second screen data after the update.

(1-6) Screen Generating Process

Figure 7A:
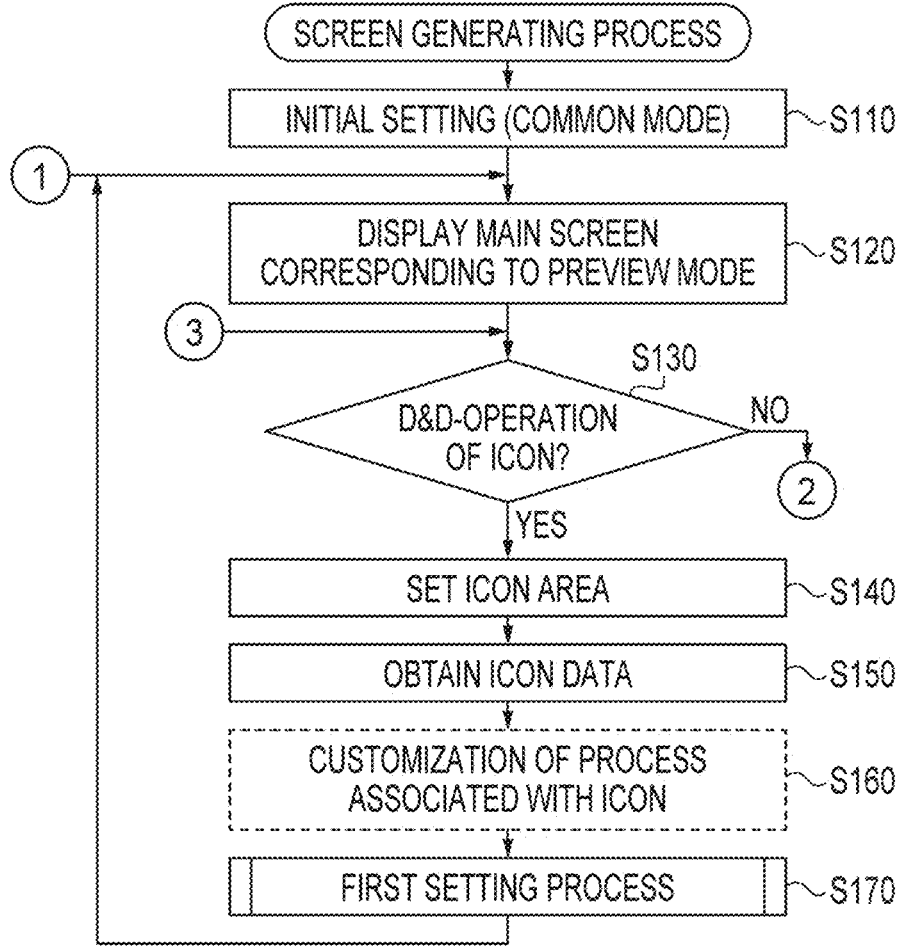
FIGS. 7A and 7B show a flowchart illustrating a screen generating process.
Figure 7B:
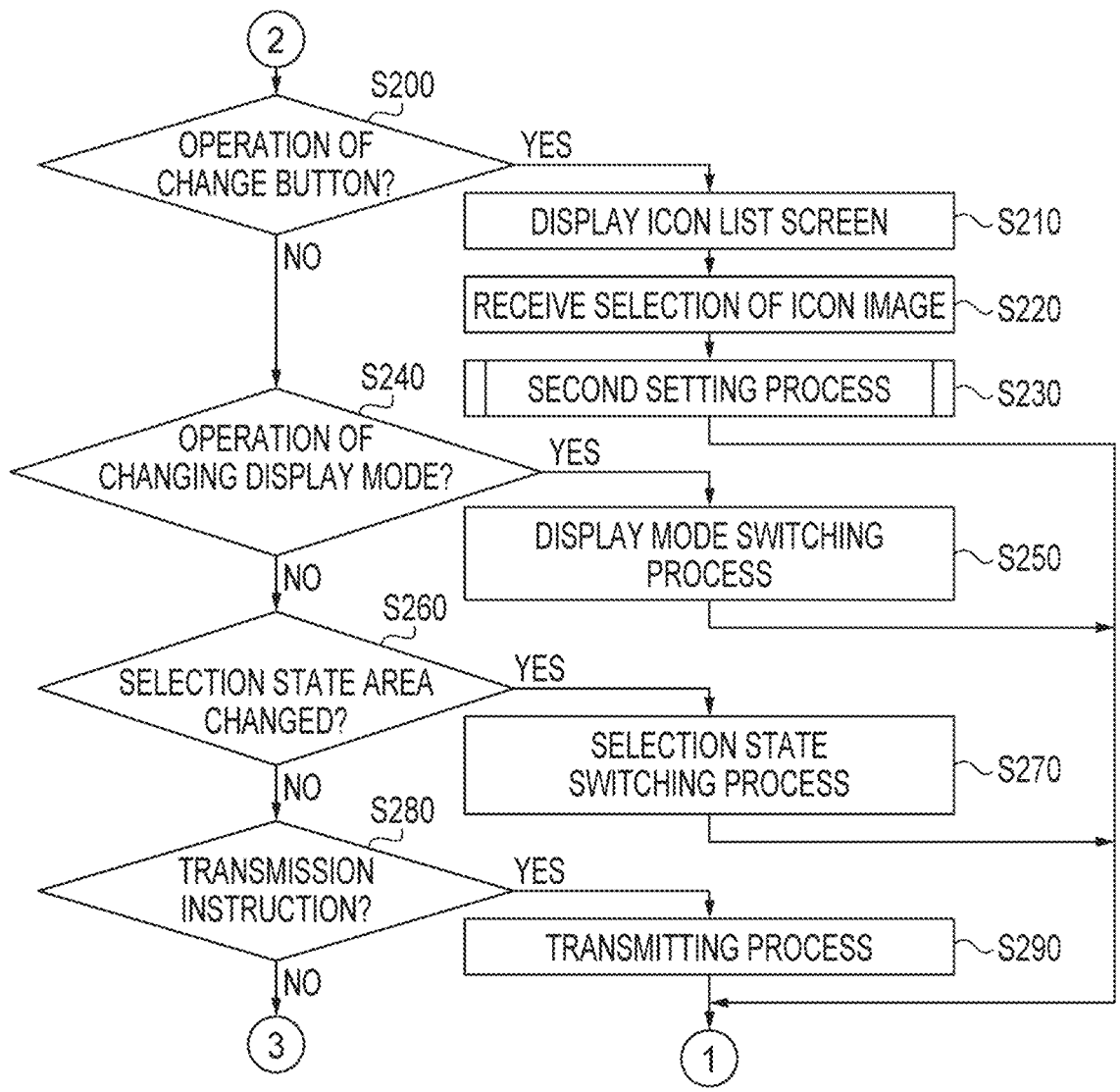

The various processes starting from the main screen 50 described with reference to FIGS. 3 to 6 are realized by the controller 21 executing the screen generating program 28 in the first information processing device 20, that is, by performing the screen generating process shown in FIGS. 7A and 7B based on the screen generating program 28. After startup, the controller 21 starts the screen generating process shown in FIGS. 7A and 7B in accordance with the screen generating program 28 when a particular execution request operation is performed to require that the screen generation process is performed.

When the screen generating process is started, the controller 21 performs various initial settings in S110. The initial settings include a process of setting the preview mode to a particular mode. The preview mode at the initial setting can be any mode. In this embodiment, for example, the preview mode is set to the common mode at the initial setting.

In S120, the main screen 50 including the customization screen according to the preview mode set in S110 is displayed on the displaying device 23. In this embodiment, in the first execution of S120 after the initial setting, the main screen 50 (see FIG. 3) including the common customization screen 60 is displayed based on the fact that the preview mode is set to the common mode.

In S130, it is determined whether the D&D operation of an image has been performed. Concretely, it is determined whether an operation to add a new icon using the direct D&D method described above (i.e., the D&D operation of an image to a vacant area) or an operation to change an icon using the direct D&D method described above (i.e., a D&D operation of an image to an already set icon) has been performed.

When the D&D operation of the image is performed, the process moves to S140. In S140, the icon area to be customized is set based on the D&D-operated position. For example, when an image is D&D-operated onto the third icon area 63, the third icon area 63 is set as the icon area to be customized.

In S150, the icon data corresponding to the D&D-operated image is obtained. When the D&D operation destination is a vacant area, that is, when a new addition of an icon is being performed, for example, the icon data in which other information except for the icon image data is set as default values is newly obtained. When the destination of the D&D operation is a previously set icon, the icon data of the previously set icon is obtained.

In S160, the customization operation for the workflow of the icon of the D&D-operated image is received. Concretely, the detailed setting screen of the workflow corresponding to the D&D-operated icon is displayed on the displaying device 23 to receive various setting operations by the user. Then, the workflow data indicating the workflow of the content set by the user is set as the workflow data for the D&D-operated icon. In this embodiment, the process of S160 is performed when the D&D operation of an icon is an operation to add a new icon, that is, when the D&D operation is a D&D operation to the vacant area. However, even when the destination of the D&D operation is a preset icon, the customization of the workflow associated with the preset icon may be received.

Figure 8:
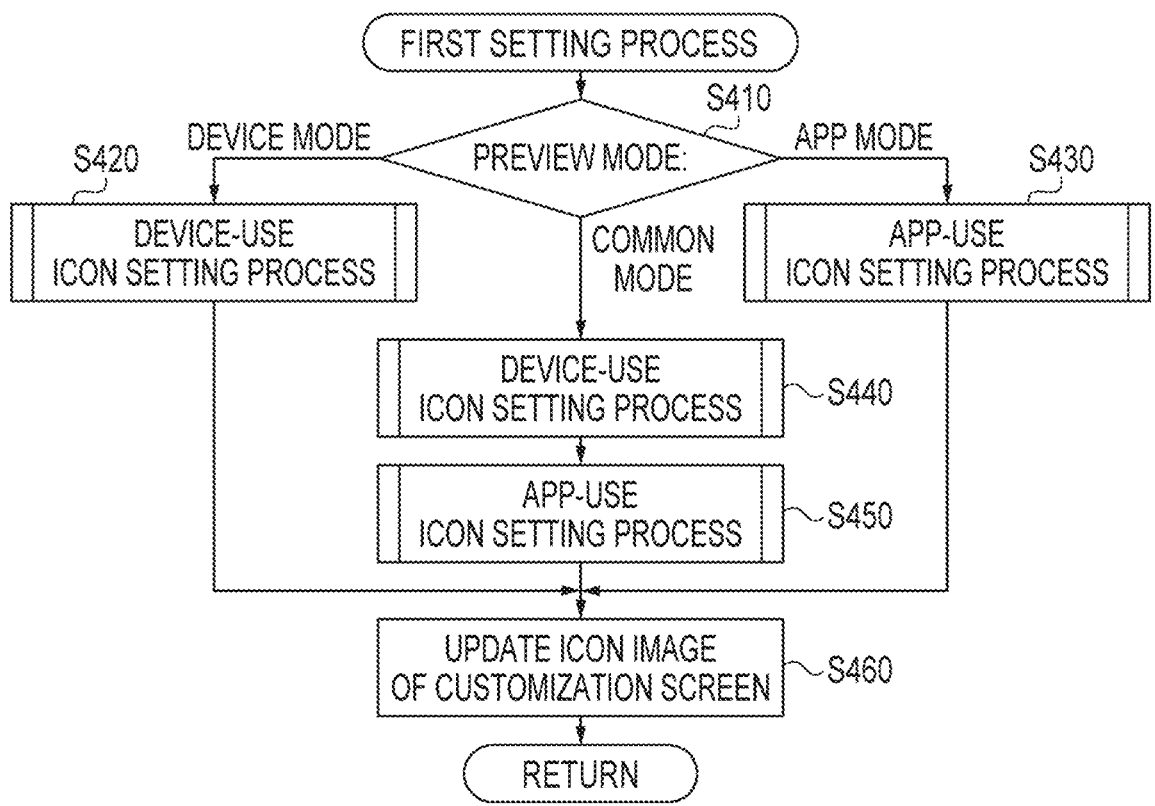
FIG. 8 shows a flowchart illustrating a first setting process.

In S170, the first setting process is executed. The details of the first setting process are as shown in FIG. 8. When the process moves to the first setting process, it is determined what mode is the currently set preview mode in S410. When the currently set preview mode is the device mode, i.e., the customization screen for devices 81 (see FIG. 4) is currently displayed on the displaying device 23, the process moves to S420. In S420, the process performs the icon setting process for devices.

Figure 9:
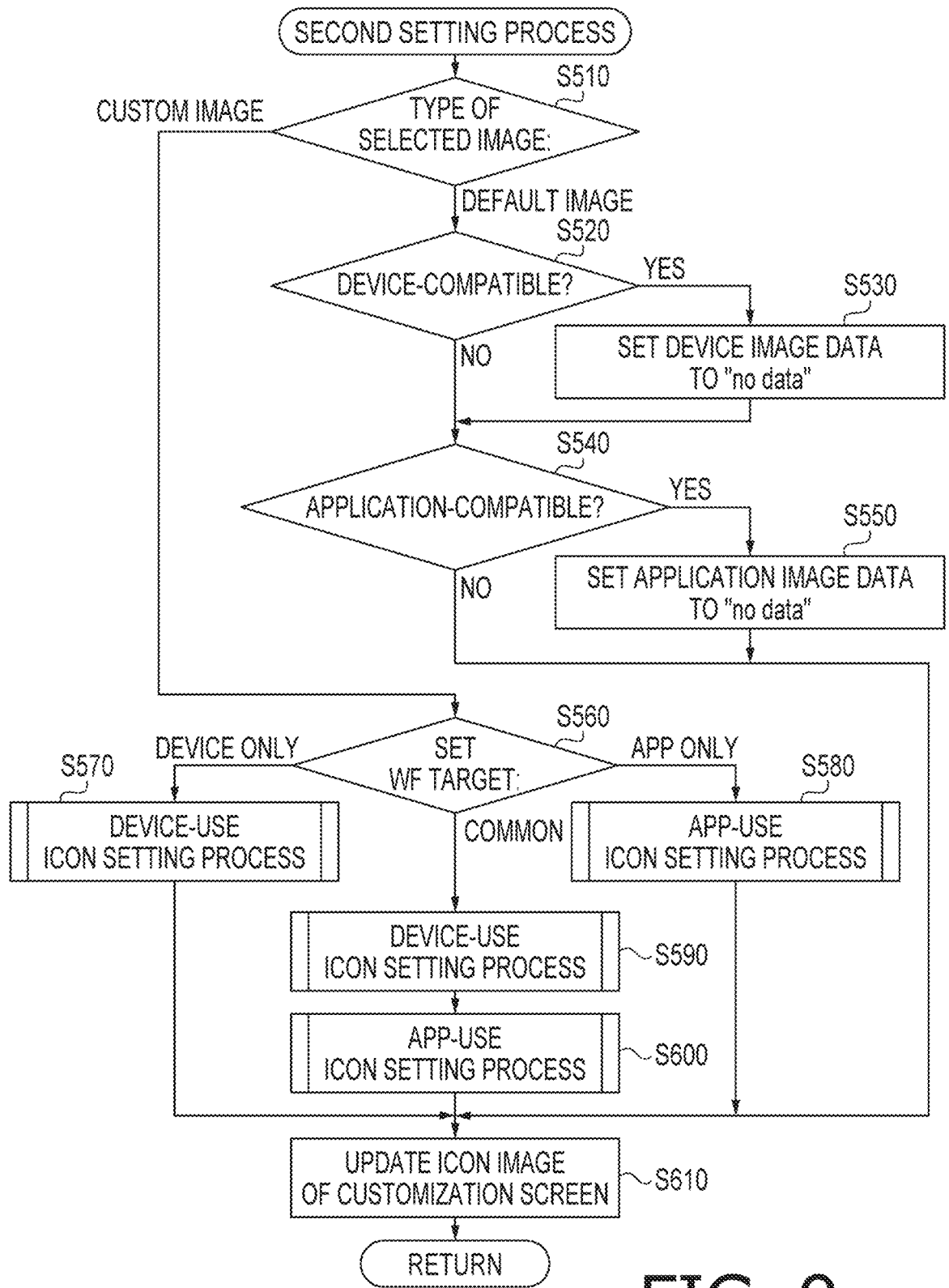
FIG. 9 shows a flowchart illustrating a second setting process.
Figure 10:
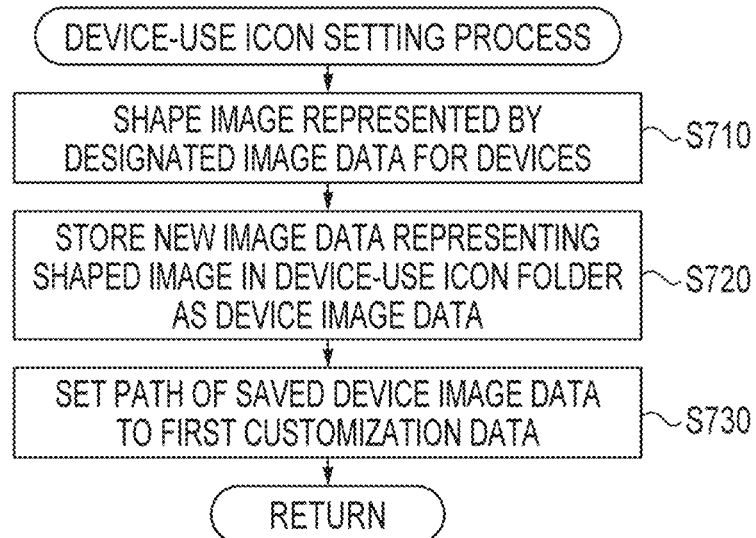
FIG. 10 shows a flowchart illustrating a device-use icon setting process.

The details of the device icon setting process in S420 are as shown in FIG. 10. When the process moves to the device icon setting process, the image represented by the designated image data is shaped for the device. It is noted that the "designated image data" in S710 in the case of the transition from S410 to S710 means the image data of the image subjected to the D&D operation in S130. The "designated image data" in S710 in the case of the transition to S710 from S560 in the second setting process (see FIG. 9) described below means the image data of one image selected in S220 below from among the images in the icon list screen.

The specifics of the image shaping in S710 may be of any kind. For example, the image shaping may include a process of enlarging or reducing the size of the image to a particular size corresponding to the size of the icon area in the displaying device 16 of the image processing device 10. The image shaping may also include, for example, processing to conform to one or more of various specifications such as resolution and aspect ratio of the displaying device 16 of the image processing device 10.

In S720, the new image data representing the image shaped in S710 is saved as device image data in an icon folder for devices in the storage 22.

In S730, a path of the image data for devices saved in the icon folder for the device is set to the first customized data. In other words, the saved image data for the device is set as a part of the first customization data. After the execution of S730, the process moves to S460 (see FIG. 8). In S460, moved from S420, the icon displayed in the icon area to be targeted for processing in the device-use customization screen 81 is updated to the image shaped in S710. After the execution of S460, the process moves to S120 (see FIG. 7A).

In S410 of FIG. 8, when the currently set preview mode is the application mode, i.e., when the customization screen 82 (see FIG. 5) for the application is currently displayed on the displaying device 23, the process moves to S430. In S430, the icon setting process for applications is performed.

Figure 11:
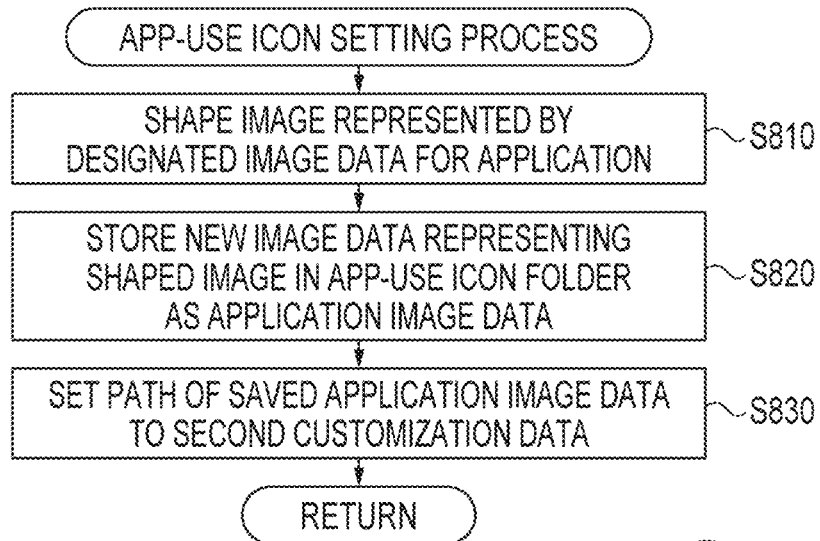
FIG. 11 shows a flowchart illustrating an application-use icon setting process.

The details of the icon setting process for applications in S430 are shown in FIG. 11. When the process moves to the icon setting process for applications, the image represented by the designated image data is shaped to the image for applications in S810. It is noted that the "designated image data" in S810 in the case of the transition from S410 to S810 means the image data of the image subjected to the D&D operation in S130. The "designated image data" in S810 in the case of the transition to S810 from S560 in the second setting process (see FIG. 9) described below means the image data of one image in the icon list screen selected in S220 described below.

The specifics of the image shaping in S810 may be of any kind. For example, the image shaping may include a process of enlarging or reducing the size of the image to a specified size corresponding to the size of the icon area in the display of the second information processing device 150. Also, for example, the image shaping may include a process of adapting to one or more of various specifications such as resolution and aspect ratio of the display of the second information processing device 150.

In S820, the new image data representing the image shaped in S810 is saved as application image data in the application icon folder in the storage 22.

In S830, the path of the image data for the application saved in the icon folder for applications is set to the second customization data. In other words, the saved image data for the application is set as a part of the second customization data. After execution of S830, the process moves to S460 (see FIG. 8). In S460 moved from S430, the icon displayed in the icon area subjected to processing in the app-use customization screen 82 is updated to the image shaped in S810.

In S410, when the currently set preview mode is the common mode, that is, when the common customization screen 60 (see FIG. 3) is currently displayed on the displaying device 23, the process moves to S440. In S440, the aforementioned icon setting process for devices (see FIG. 10) is performed. In S450, the aforementioned icon setting process for the application (see FIG. 11) is performed. After the execution of S450, the process moves to S460.

In S460, moved from S450, the integration icon displayed in the icon area targeted to be processed in the common customization screen 60 is updated to the integration icon according to the display rules described above.

Returning to FIG. 7A, when the D&D operation of the icon is not performed in S140, the process moves to S200. In S200, it is determined whether any of the common change buttons 71b, the device change button 72b, and the application change button 73b has been selectively operated. If any of the change buttons has been selectively operated, the process moves to S210.

In S210, the aforementioned icon list screen is displayed on the displaying device 23. In S220, the user's selection of an icon image from the icon list screen is received. In S230, the second setting process is performed. The details of the second setting process are as shown in FIG. 9.

When moving to the second setting process, in S510, it is determined whether the type of the icon image selected from the icon list screen is a default image or a custom image. It is noted that the default image may be an image that can be displayed by both the image processing device 10 and the function execution application, or an image that can be displayed by only one of them. The custom image can be displayed by both the image processing device 10 and the function execution application.

When the type of the selected icon image is the default image, the process moves to S520. In S520, it is determined whether the selected icon image is compatible with devices, that is, whether it is an image that can be displayed by the image processing device 10. When the selected icon image is not compatible with devices, the system moves to S540. When the selected icon image is compatible with devices, the process moves to S530. In S530, the device image data is set to "no data." After the execution of S530, the process moves to S540.

In S540, it is determined whether the selected icon image is compatible with applications, that is, whether the selected icon image is an image that can be displayed by an application for executing a function in the second information processing device 150. When the selected icon image is not compatible with applications, the process moves to S610. When the selected icon image is compatible with applications, the process moves to S550. In S550, the application image data is set to "no data." After the execution of S550, the system moves to S610.

In S610, moved from S540 or S550, the icon image in the currently displayed customization screen is updated as necessary according to the results of the processing of S520 to S550. After the execution of S610, the process moves to S120 (see FIG. 7A).

In S510, when the type of the selected icon image is the custom image, the process moves to S560. In S560, it is determined what is set as a target of the workflow set in the selected state area. That is, it is determined whether the workflow for the device or the workflow for the application is set in the selected state area.

When the workflow for devices is set to the selected state area and the workflow for applications is not set thereto, the process moves to S570. In S570, the device image data in the selected state area is updated by executing the aforementioned icon setting process for devices shown in FIG. 10. After execution of S570, the process moves to S610. In S610, moved from S570, S580, or S600, the icon image in the currently displayed customization screen is updated to the image represented by the image data that has been updated in the processing before the process moves to S610.

When, in the selected state area, the workflow for applications is set but the workflow for devices is not set, the process moves to S580. In S580, the application image data in the selected state area is updated by performing the aforementioned application icon setting process shown in FIG. 11. After execution of S580, the process moves to S610.

When, in the selected state area, both the workflow for devices and the workflow for the applications are set, the process moves to S590. In S590, the device image data in the selected state area is updated by executing the aforementioned device icon setting process shown in FIG. 10. After execution of S590, the process moves to S600. In S600, the application image data in the selected state area is updated by performing the aforementioned application icon setting process shown in FIG. 11. After the execution of S600, the process moves to S610.

Returning to FIGS. 7A and 7B, when none of the change buttons are selectively operated in S200, the process moves to S240. In S240, it is determined whether a changing operation to change the preview mode is performed. When it is determined that the operation to change the preview mode is performed, the process moves to S250. In S250, the display mode switching process is performed. That is, the preview mode is changed to the new preview mode in accordance with the change performed by the changing operation. After the execution of S250, the process moves to S120.

In S240, when the operation to change the preview mode has not been performed, the process moves to S260. In S260, it is determined whether the operation to change the selection state area has been performed. When the operation to change the selection state area has been performed, the process moves to S270. In S270, a selection state switching process is performed, i.e., the icon area designated by the operation to change the selection state area is set to the new selection state area. After the execution of S270, the process moves to S120.

In S270, when the selection state area has not been changed, the process moves to S280. In S280, it is determined whether a transmission instruction has been made, that is, whether the transmission button 55 has been selectively operated. When the transmission instruction has been made, the process moves to S290. In S290, the transmitting process is performed. That is, as described above, the latest first customization data and the second customization data at the time when the transmission button 55 is selectively operated are sent to the corresponding destinations, respectively. In S280, when no transmission instruction is made, the process moves to S130.

(1-7) Effect of Embodiment

According to the embodiment described above, the screen generating program 28 can separately and efficiently generate the function selection screen 30 displayed on the image processing device 10 and the function selection screen 151 displayed by the function execution application of the second information processing device 150.

Concretely, by setting the preview mode to the common mode, the icons in each of the function selection screens 30 and 151 can be newly generated or changed at a batch (see FIG. 3).

Further, by setting the preview mode to the device mode, only the function selection screen 30 of the image processing device 10 can be customized (see FIG. 4). Also, by setting the preview mode to the application mode, only the function selection screen 151 configured by the function execution application can be customized (see FIG. 5).

In the main screen 50 (see FIG. 3) in the common mode, in addition to the common preset image 71a, the device preset image 72a and the application preset image 73a are also displayed in the common image setting frame 71. Therefore, the user can check the device icon and application icon individually even in the common mode.

In addition to the common change button 71b, the device change button 72b and the application change button 73b are also displayed in the common image setting frame 71. Therefore, the user can not only customize all of the function selection screens 30 and 151 at a batch in the common mode, but can also customize only one of the function selection screens 30 and 151 if necessary.

In this embodiment, the function selection screen 30 displayed on the image processing device 10 corresponds to an example of the first screen. The icon area and the selection state area designated by the D&D operation correspond to an example of the setting target area and the change target area. The D&D operation of an image or icon from the image file list or icon list screen corresponds to an example of an icon designating operation. The preview mode corresponds to an example of a display mode. The device mode corresponds to an example of the first mode. The application mode corresponds to an example of the second mode. The manner in which both the first identification image 68 and the second identification image 69 are displayed corresponds to an example of a third identification image.

The process of S120 corresponds to an example of the display process. The process of S140 corresponds to an example of the area setting process. The process of S130 corresponds to an example of an icon designating process. The processes of S440, S450, S590, and S600 correspond to an example of a both screen setting process. The processes of S460 and S610 correspond to an example of generating process. The processes of S240 to S250 correspond to an example of a mode setting process. The process of S420 and S570 corresponds to an example of a first screen setting process. The processes of S430 and S580 correspond to an example of a second screen setting process. The processes of S200 to S220 correspond to an example of a change receiving process. The process of S230 corresponds to an example of the both screen setting process, the first screen setting process and the second screen setting process. The process of S160 corresponds to an example of a first process setting process and a second process setting process.

2. Other Embodiments

The present invention is not necessarily be limited to the above-mentioned embodiment, but can be implemented in various modifications.

(2-1) The number of icons that can be displayed simultaneously on the function selection screens is not limited to three. For example, a maximum of two or less icons can be displayed simultaneously, or a maximum of four or more icons can be displayed simultaneously.

(2-2) In the device mode and the application mode, the common preset image 71*a* and the common change button 71*b* may be displayed in the detail area 53. In other words, even in the device mode and the application mode, the function selection screens 30 and 151 may be customized in a batch.

(2-3) The method of switching the preview mode is not necessarily be limited to the method of switching via the preview mode change box 66. For example, the above-described configuration may be modified so that each time the switching button is selected (e.g., tapped), the three preview modes are switched sequentially in a toggle fashion.

(2-4) Each of the customization screens 60, 81 and 82 may be displayed in such a way that the user can see which preview mode is set. For example, the background color or background graphic of each of the customization screens 60, 81 and 82 may be differentiated for each preview mode.

(2-5) The screens that can be customized by the screen generating program 28 are not necessarily be limited to the function selection screens 30 and 151. It may also be possible that customization screens displayed on various devices different from the image processing device 10 and the second information processing device 150 by the screen generating program 28.

(2-6) The multiple functions possessed by one component in the above embodiment may be realized by multiple components, or one function possessed by one component may be realized by multiple components. Multiple functions possessed by multiple components may be realized by a single component, or a single function realized by multiple components may be realized by a single component. In addition, some of the components of the above embodiment may be omitted. At least some of the configurations of the above embodiments may be added to or replaced with other configurations of the above embodiments.

What is claimed is:

1. A non-transitory computer-readable recording medium for a first information processing device provided with a display, an inputting device and a controller, wherein the recording medium containing computer-executable instructions which cause, when executed, the controller to generate first data representing a first screen to be displayed by an image processing device, and second data representing a second screen to be displayed by a second information processing device, wherein the instructions further cause, when executed, the controller to perform:

a displaying process of displaying a preview area on the display, the preview area including a customizing screen for each of the first and second screens, the customizing screen having a first icon area, a second icon area, and a third icon area in each of the first screen and the second screen, the customizing screen being a virtual representation of each of the first and second screens to be displayed by the image processing device and the second information processing device, respectively;

an area setting process of setting one of the first icon area, the second icon area, and the third icon area included in the customizing screen as a setting target area;

an icon designation process of receiving an icon designation operation to designate an icon through the inputting device, the icon being an image indicating a process to be executed by at least one of the image processing device and the second information processing device;

a preview updating process of displaying the icon designated by the icon designation operation in the setting target area displayed in the preview area;

an icon setting process including a both screen setting process of setting the icon designated by the icon designation operation to be displayed in an icon area corresponding to the setting target area set by the area setting process among the first icon area, the second icon area, and the third icon area of each of the first screen and the second screen;

a data generating process of generating first screen data and second screen data based on a setting result of the icon setting process; and a mode setting process of selectively setting a display mode of the customizing screen to one of a common mode, a first mode and a second mode, wherein the both screen setting process is performed in response to the area setting process and the icon designation process being performed when the display mode is set to the common mode, wherein the icon setting process further includes:

a first screen setting process which is performed in response to the area setting process and the icon designation process being performed when the display mode is set to the first mode, the icon designated by the icon designation operation in the first mode being displayed in an icon area, in the first screen, corresponding to the setting target area by the area setting process, the icon designated by the icon designation operation being not displayed on the second screen; and a second screen setting process which is performed in response to the area setting process and the icon designation process being performed when the display mode is set to the second mode, the icon designated by the icon designation operation in the second mode being displayed in an icon area, in the second screen, corresponding to the setting target area by the area setting process, the icon designated by the icon designation operation being not displayed on the first screen;

wherein the displaying process includes:

a first displaying process of displaying, on the customizing screen, an icon set by the icon setting process to be displayed on the first screen in response to the displaying mode being set to the first mode:

a second displaying process of displaying, on the customizing screen, an icon set by the icon setting process to be displayed on the second screen in response to the display mode being set to the second mode; and a third displaying process, in response to the display mode being set to the common mode, for each of the first icon area, the second icon area, and the third icon area, the third displaying process including:

when a second icon is set, by the icon setting process, to be displayed on one of the first screen and the second screen, displaying the second icon on the customizing screen;

when a third icon is set, by the icon setting process, to be displayed on both the first screen and the second screen, displaying the third icon on the customizing screen for each of the first and second screens; and when, by the icon setting process, a first icon is set to be displayed on the first screen and the second icon is set to be displayed on the second screen, displaying a particular icon on the customizing screen for each of the first and second screens, the particular icon being an icon in which the first icon and the second icon are partially superimposed on each other.

2. The recording medium according to claim 1,
wherein the third displaying process includes a process of:

displaying a first identification image in an icon area, which is set, by the icon setting process, to display the icon only on the first screen, among the first icon area, the second icon area, and the third icon area;

displaying a second identification image in an icon area, which is set, by the icon setting process, to display the icon only on the second screen, among the first icon area, the second icon area, and the third icon area; and displaying a third identification image in an icon area, which is set, by the icon setting process, to display the icon on both the first screen and the second screen, among the first icon area, the second icon area, and the third icon area.

3. The recording medium according to claim 1,
wherein the instruction further cause, when executed, the controller to perform a change receiving process to be executed when the display mode is set to the common mode, the change receiving process receiving an icon changing operation including an icon change operation to designate a new icon targeted to one change target area among the first icon area, the second icon area, and the third icon area on the customizing screen, and wherein the icon setting process further includes a both screen changing process of causing each of the first screen and the second screen to display, in an icon area corresponding to the change target area, the new icon designated by the icon change operation instead of an icon currently set.

4. The recording medium according to claim 3,
wherein the change receiving process is configured to receive a change target designating process designating one of (a) both the first screen and the second screen, (b) the first screen, and (c) the second screen as a change target;

wherein the both screen changing process is performed when both the first screen and the second screen are designated as the change target;

wherein the icon setting process further includes:

in response to the change receiving process being performed and the first screen is designated as the change target by the change target designating process, a first screen changing process of setting the new icon designated by the icon change operation to be displayed, instead of the icon currently set, in an icon area corresponding to the change target area on the first screen; and in response to the change receiving process being performed and the second screen is designated as the change target by the change target designating process, a second screen changing process of setting the new icon designated by the icon change operation to be displayed, instead of the icon currently set, in an icon area corresponding to the change target area on the second screen.

5. The recording medium according to claim 1,
wherein the instructions further cause, when executed, the controller to perform:

a first process setting process of associating an icon set to be displayed on the first screen with a first process, the first process being a process performed by the image processing device in response to the icon set to be displayed on the first screen being operated in the image processing device; and a second process setting process of associating an icon set to be displayed on the second screen with a second process, the second process being a process performed by the second information processing device in response to the icon set to be displayed on the second screen being operated in the second information processing device.

6. An information processing device, comprising:
a display;
an inputting device; and
a controller,
wherein the information processing device is configured to generate first data representing a first screen to be displayed by an image processing device, and second data representing a second screen to be displayed by a second information processing device,
wherein the controller is configured to perform:

a displaying process of displaying a preview area on the display, the preview area including a customizing screen for each of the first and second screens, the customizing screen having a first icon area, a second icon area, and a third icon area in each of the first screen and the second screen, the customizing screen being a virtual representation of each of the first and second screens to be displayed by the image processing device and the second information processing device, respectively;
an area setting process of setting one of the first icon area, the second icon area, and the third icon area included in the customizing screen as a setting target area;
an icon designation process of receiving an icon designation operation to designate an icon through the inputting device, the icon being an image indicating a process to be executed by at least one of the image processing device and the second information processing device;
a preview updating process of displaying the icon designated by the icon designation operation in the setting target area displayed in the preview area;
an icon setting process including a both screen setting process of setting the icon designated by the icon designation operation to be displayed in an icon area corresponding to the setting target area set by the area setting process among the first icon area, the second icon area, and the third icon area of each of the first screen and the second screen;
a data generating process of generating first screen data and second screen data based on a setting result of the icon setting process; and
a mode setting process of selectively setting a display mode of the customizing screen to one of a common mode, a first mode and a second mode,
wherein the both screen setting process is performed in response to the area setting process and the icon designation process being performed when the display mode is set to the common mode,
wherein the icon setting process further includes:
a first screen setting process which is performed in response to the area setting process and the icon designation process being performed when the display mode is set to the first mode, the icon designated by the icon designation operation in the first mode being displayed in an icon area, in the first screen, corresponding to the setting target area by the area setting process, the icon designated by the icon designation operation being not displayed on the second screen; and
a second screen setting process which is performed in response to the area setting process and the icon designation process being performed when the display mode is set to the second mode, the icon designated by the icon designation operation in the second mode being displayed in an icon area, in the second screen, corresponding to the setting target area by the area setting process, the icon designated by the icon designation operation being not displayed on the first screen;
wherein the displaying process includes:
a first displaying process of displaying, on the customizing screen, an icon set by the icon setting process to be displayed on the first screen in response to the displaying mode being set to the first mode:
a second displaying process of displaying, on the customizing screen, an icon set by the icon setting process to be displayed on the second screen in response to the display mode being set to the second mode; and
a third displaying process, in response to the display mode being set to the common mode, for each of the first icon area, the second icon area, and the third icon area, the third displaying process including:
when a second icon is set, by the icon setting process, to be displayed on one of the first screen and the second screen, displaying the second icon on the customizing screen;
when a third icon is set, by the icon setting process, to be displayed on both the first screen and the second screen, displaying the third icon on the customizing screen for each of the first and second screens; and
when, by the icon setting process, a first icon is set to be displayed on the first screen and the second icon is set to be displayed on the second screen, displaying a particular icon on the customizing screen for each of the first and second screens, the particular icon being an icon in which the first icon and the second icon are partially superimposed on each other.

7. A screen generating method performed in an information processing device,
the information processing device being configured to generate first data representing a first screen to be displayed by an image processing device, and second data representing a second screen to be displayed by a second information processing device,
the method comprising:
displaying a preview area on the display, the preview area including a customizing screen for each of the first and second screens, the customizing screen having a first icon area, a second icon area, and a third icon area in each of the first screen and the second screen, the customizing screen being a virtual representation of each of the first and second screens to be displayed by the image processing device and the second information processing device, respectively;
setting one of the first icon area, the second icon area, and the third icon area included in the customizing screen as a setting target area;
receiving an icon designation operation to designate an icon through an inputting device, the icon being an image indicating a process to be executed by at least one of the image processing device and the second information processing device;
updating the preview area by displaying the icon designated by the icon designation operation in the setting target area displayed in the preview area;
setting the icon designated by the icon designation operation to be displayed in an icon area corresponding to the setting target area set by an area setting process among the first icon area, the second icon area, and the third icon area of the first screen and the second screen; and
generating first screen data and second screen data based on a setting result of the icon setting process;
selectively setting a display mode of the customizing screen to one of a common mode, a first mode and a second mode,
wherein the setting the icon is performed in response to the setting one of the first icon area, the second icon area, and the third icon area and the receiving an icon designation operation is performed when the display mode is set to the common mode,
wherein the setting the icon further includes:
setting a first screen in response to the area setting and the icon designation being performed when the display mode is set to the first mode, the icon designated by the icon designation operation in the first mode being displayed in an icon area, in the first screen, corresponding to the setting target area, the icon designated by the icon designation operation being not displayed on the second screen;

setting a second screen in response to the area setting and the icon designation being performed when the display mode is set to the second mode, the icon designated by the icon designation operation in the second mode being displayed in an icon area, in the second screen, corresponding to the setting target area, the icon designated by the icon designation operation being not displayed on the first screen;

wherein the displaying a preview area includes:

displaying, on the customizing screen, an icon set by the icon setting to be displayed on the first screen in response to the displaying mode being set to the first mode:

displaying, on the customizing screen, an icon set by the icon setting to be displayed on the second screen in response to the display mode being set to the second mode; and displaying, in response to the display mode being set to the common mode, for each of the first icon area, the second icon area, and the third icon area, including:

when a second icon is set, by the icon setting, to be displayed on one of the first screen and the second screen, displaying the second icon on the customizing screen;

when a third icon is set, by the icon setting, to be displayed on both the first screen and the second screen, displaying the third icon on the customizing screen for each of the first and second screens; and when, by the icon setting process, a first icon is set to be displayed on the first screen and the second icon is set to be displayed on the second screen, displaying a particular icon on the customizing screen for each of the first and second screens, the particular icon being an icon in which the first icon and the second icon are partially superimposed on each other.

* * * * *